Figure 1:
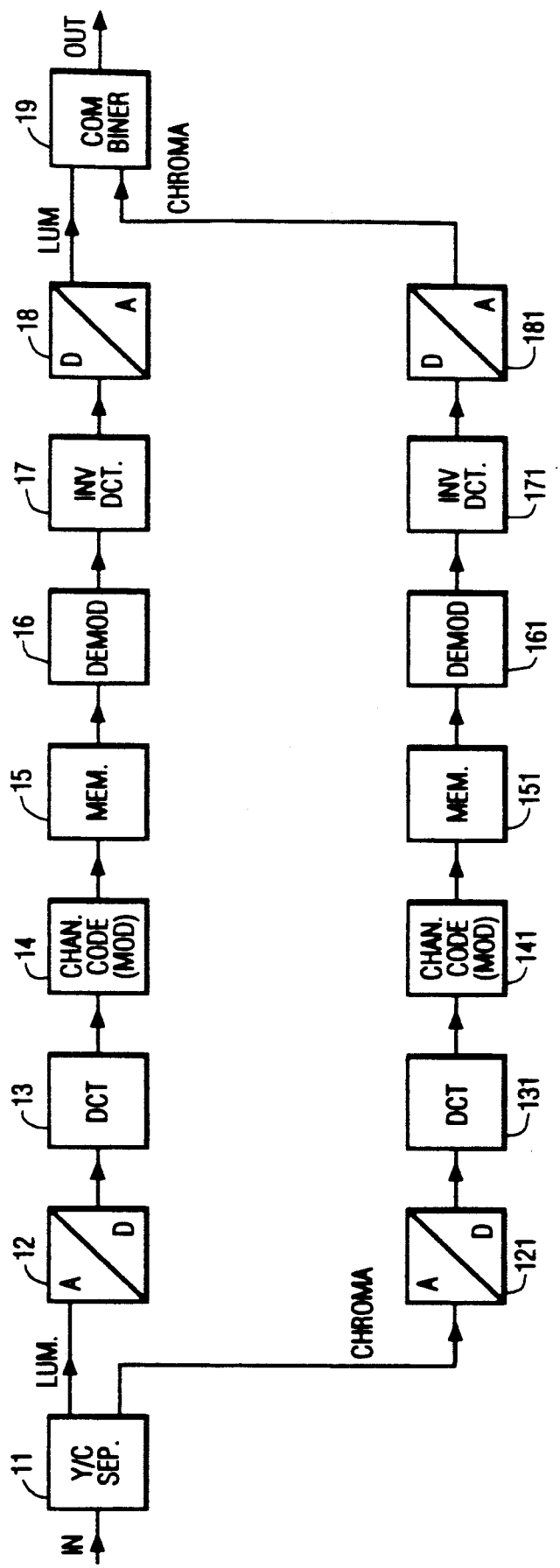

United States Patent [19]
Keesen

[11] Patent Number: 5,239,308
[45] Date of Patent: Aug. 24, 1993

[54] DIGITAL SIGNAL PROCESSING SYSTEM

[75] Inventor: Heinz-Werner Keesen, Hanover, Fed. Rep. of Germany

[73] Assignee: Deutsche Thomson-Brandt GmbH, Villingen, Fed. Rep. of Germany

[21] Appl. No.: 835,737

[22] Filed: Feb. 13, 1992

[30] Foreign Application Priority Data

Aug. 3, 1989 [DE] Fed. Rep. of Germany ....... 3925663

[51] Int. Cl.$^5$ ............................................. H03M 7/40
[52] U.S. Cl. ............................................ 341/67; 341/65
[58] Field of Search ........................... 341/67, 65, 50

[56] References Cited

U.S. PATENT DOCUMENTS

| | | |
|---|---|---|
| 3,553,362 | 1/1971 | Mounts et al. . |
| 4,075,622 | 2/1978 | Lawrence et al. ............... 341/67 |
| 4,139,867 | 2/1979 | Foerster . |
| 4,672,441 | 6/1987 | Hoelzlwimmer . |
| 4,985,700 | 1/1991 | Mikami ............................ 341/67 X |

FOREIGN PATENT DOCUMENTS

| | | |
|---|---|---|
| 0276753 | 8/1988 | European Pat. Off. . |
| 2835434 | 2/1980 | Fed. Rep. of Germany . |
| 8601005 | 11/1987 | Netherlands . |

*Primary Examiner*—Sharon D. Logan
*Attorney, Agent, or Firm*—Joseph S. Tripoli; Joseph J. Laks; Francis A. Davenport

[57] ABSTRACT

A method of signal processing batch-bulk coded digital signals which are segmented into variable-length words and the variable-length words are allocated to constant-length blocks. The constant-length blocks which receive a variable-length word having a word length which is shorter than a predetermined word length are filled up with portions of variable-length words having a word length longer than the predetermined word length. Several successive constant-length blocks are combined into superblocks, and one address word which identifies the superblock location is added at one end of each superblock. The sum of the variable-length words within each superblock is smaller than, or equal to, the sum of the constant-length blocks within the superblock.

9 Claims, 5 Drawing Sheets

DIGITAL SIGNAL PROCESSING SYSTEM

This is a continuation of PCT application PCT/EP 90/01258 filed Aug. 1, 1990 by Heinz-Werner Keesen and titled "Digital Signal Processing System".

This invention is directed to a digital signal processing system for batch-bulk coded signals. The packing density of digital signals (information) is often subjected to temporal fluctuations during transmission and/or recording. This also is applicable to untreated signals for example to video signals which were treated with a source coder for irrelevancy and redundancy reduction. Designing the transmission route, or the recording medium, for the maximum packing density is technically expensive and uneconomic. The packing density can be held to an average value through temporal compression and subsequent expansion. However, various word lengths of the data segments can result, depending upon the packing density. This creates a problem in recognizing data segments of differing lengths and in allocating the correct position of the blocks in the output picture. Data segment recognition is particularly difficult if interference removes the recognition criteria. If such interference occurs, it is possible that an accurate recognition can not be made, even after the interference has died out. A similar problem occurs in a digital video recorder which is operating in a "search" mode whereby the data can only be read piece by piece in short segments. It should be possible to reconstruct a low quality picture from the relatively short data segments read in a rapid "search" operating mode.

The invention is directed to an improved method of digital signal recording and reproduction so that the signal, for example a picture, can be decoded with sufficient quality with batch-bulk coded (segment-wise) signals from a medium running at higher or search speed.

U.S. Pat. No. 4,907,101 teaches the batch-bulk recording of digital signals which have been received segment-wise. Data blocks having data segments with a smaller than average word length are filled with parts of the data segments from blocks having a larger than average word length. The data can, for example, consist of the coefficients of a discrete cosine transformation DCT. The direct or DC component and one, or several, important alternating or AC components and a terminating end-of-block characteristic or flag are first recorded for each n×m picture element block, typically n=8 and m=8. When the data segment length of the coded block is smaller than an average data segment length, the remaining available space is filled up with alternating components of a block which requires a larger than average data segment length and, if it fits, with the respective end-of-block characteristic. Since the blocks are of equal length, the start of each block will be at equal time intervals which aids the location during playback in the presence of errors.

In a conventional helical-scan recording system operating in the "search" mode, the reading heads or transducers, move over the recorded tracks at an angle different from that in the normal reproduction mode of operation with the consequence that tracks are only partially or batch-bulk read. Even with a reading head mounted on actuators to provide accurate track following adjustment, there are search speeds where the recorded tracks will be only partially or batch-bulk read. The problem is the spatial positioning of the recovered segment of data blocks in the complete decoded signal, or picture. The solution is to insert location information at particular points in the signal to be recorded and to locate the signal components in accordance with the location information. The end-of-block characteristic appears to be most suitable for this purpose. However, if a location information is added to every end-of-block characteristic the amount of data to be recorded is markedly increased.

Another possibility is the combination of several blocks, for example, eight, into a larger block, hereinafter called a 'superblock', and to provide an address for the location of the 'superblock' within the picture at the start or end of the superblock. The data rate is only negligibly increased by the recording of a single address for each superblock and the total coder efficiency is increased. The output signal is reassembled from the almost equally spaced (in time) decoded superblocks. The signal is segmented according to the size of the superblocks and can have an unchanged spatial resolution.

A further possibility is to use the DCT coefficients that U.S. Pat. No. 4,907,101 teaches, but modify the recording sequence of the direct and alternating components of the transformation.

In a modified recording sequence the DC components of all the blocks of one track are recorded at the start of a track. The track addresses of the important AC components of the associated blocks are recorded next followed by the corresponding AC coefficients. The track addresses of the less important AC components and the less important AC components are recorded last. Less important alternating components are, for example, transformation coefficients with small amplitudes. Such a track section of the signal can represent one segment or two segments, i.e. picture signal can consist of one or two segments.

Several options are available for reading and decoding at the higher search speed.

(1) Direct components, important alternating components, along with their track addresses, and some of the less important alternating components and their track addresses are decoded.

(2) Direct components, important alternating components and their addresses are decoded.

(3) Direct components only, are read and decoded. At a lower search speed a relatively high quality signal with a full temporal but somewhat reduced spatial resolution, results; and at a higher search speed a lower quality signal is produced having full temporal but significantly reduced spatial resolution. This conforms with the expectation of the viewer. It is also possible to combine two or several of the above named recording options.

Figure 2:
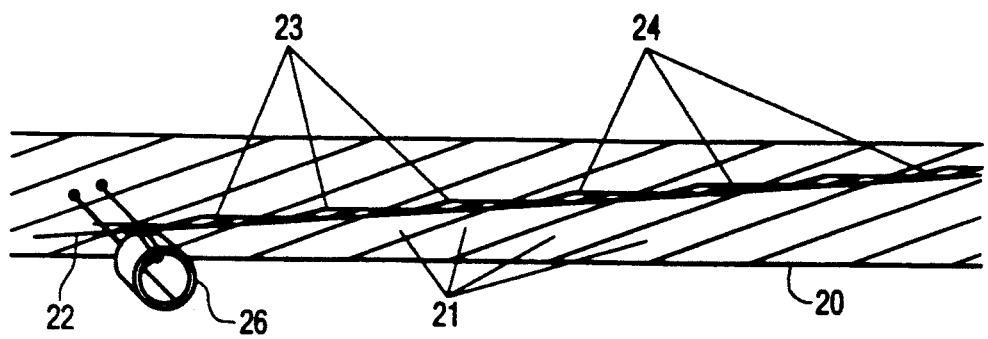
Figure 3:
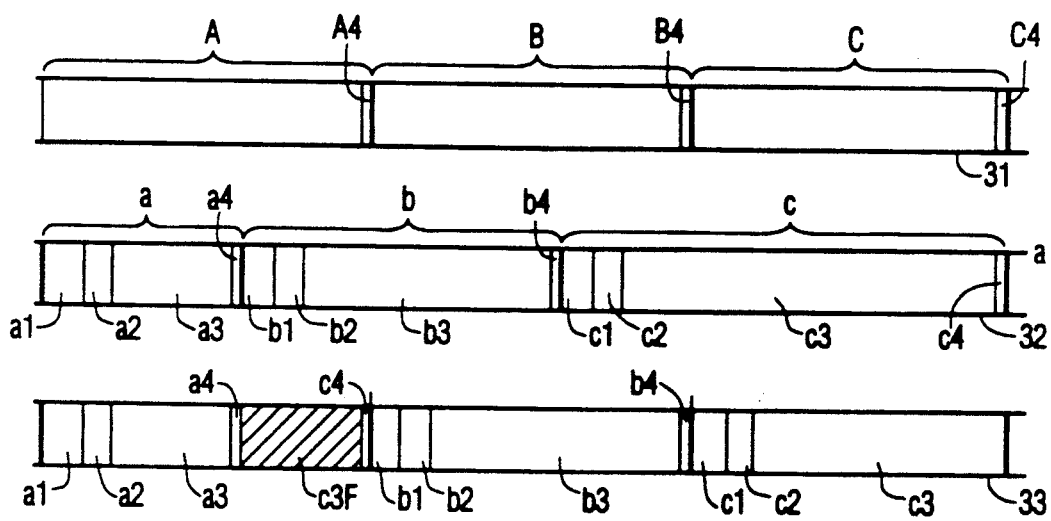
Figure 4:
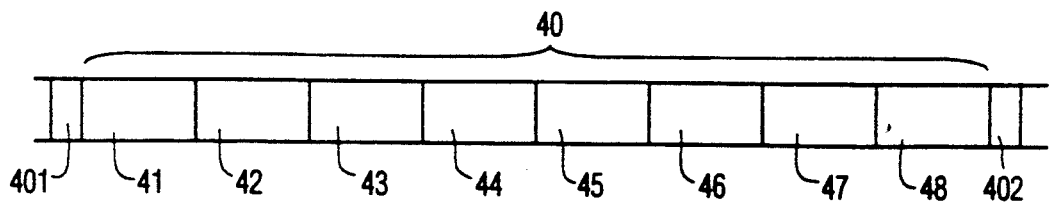
Figure 5:
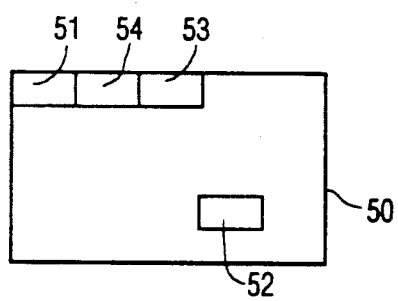
Figure 6:
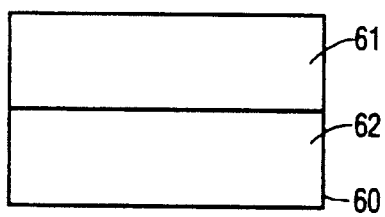
Figure 7:
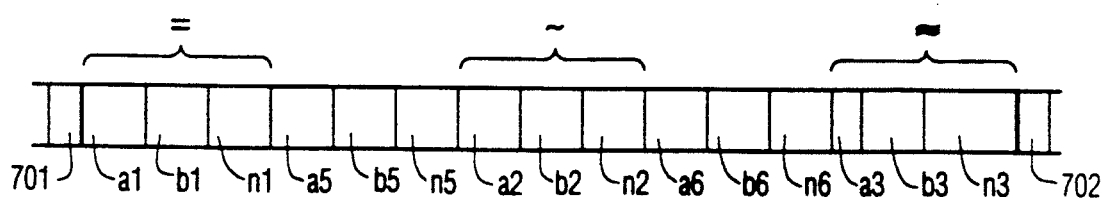
Figure 8:
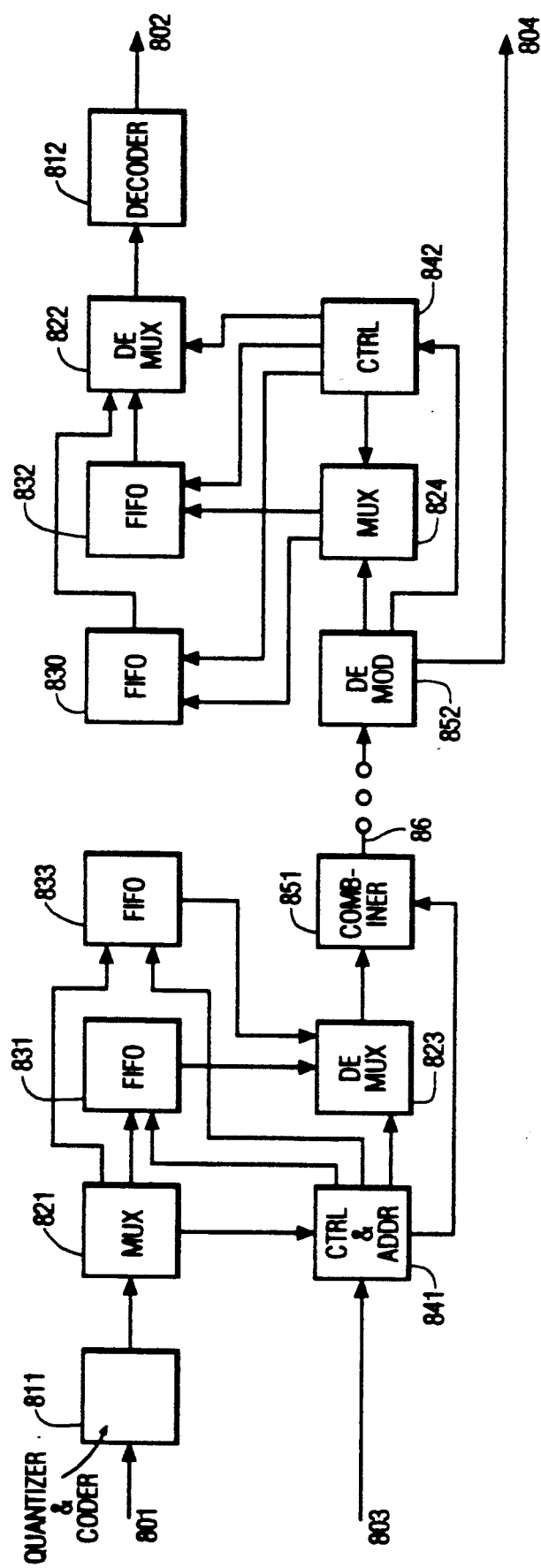
Figure 9:
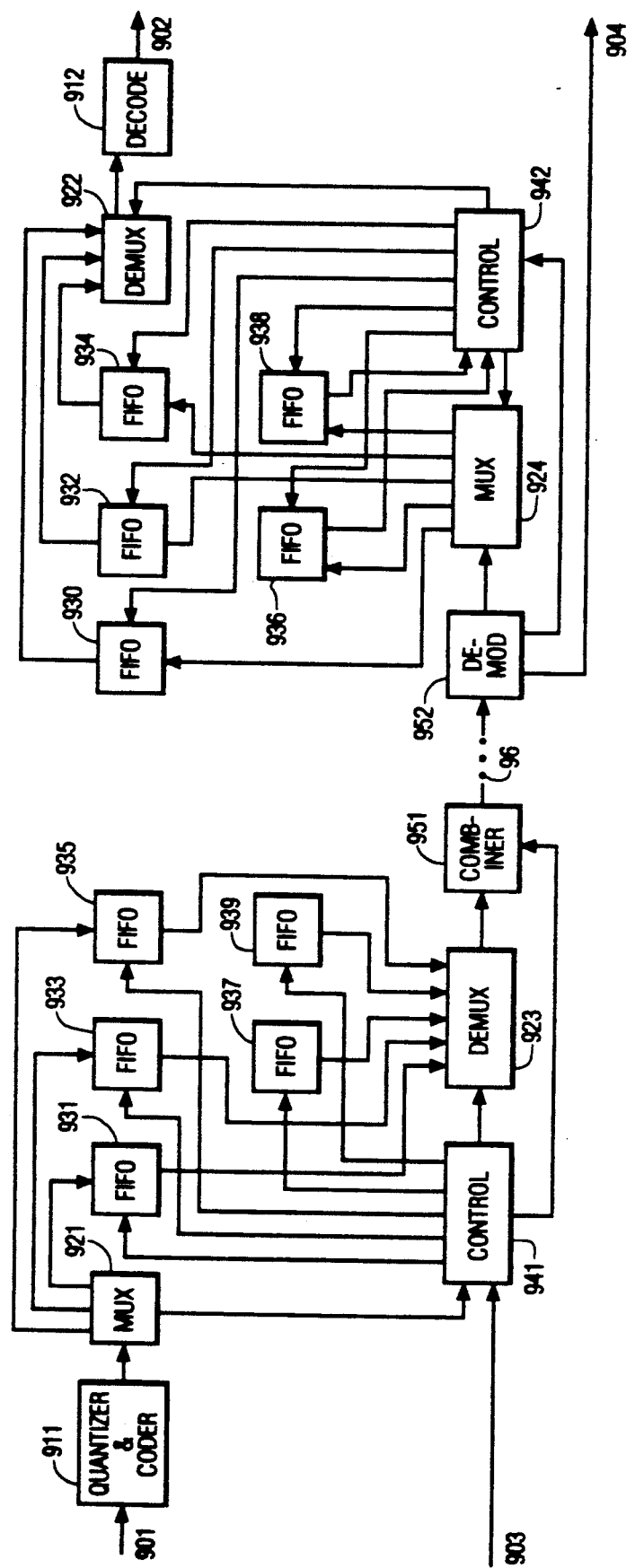

In the FIGURES:

FIG. 1 is a block diagram of a video signal processing system,

FIG. 2 shows the tracks of a digitally coded video signal on a magnetic tape with helical-scan recording and with a scanning path of the video heads in "search" operating mode, FIG. 3 shows a known recording method of blockwise coded video signals, FIG. 4 shows a superblock recorded on one track of magnetic tape according to the invention, FIG. 5 shows the location of superblocks within a display picture, FIG. 6 shows the locations within the picture of several, or all, of the blocks of one track according to a further inventive recording method, FIG. 7 shows the arrangement of the signal components of the FIG. 6 method on one track of a magnetic tape, FIG. 8 is a block diagram of a preferred embodiment which uses the method according to FIGS. 4 and 5, FIG. 9 a block diagram of a preferred embodiment which uses the method according to FIGS. 6 and 7.

FIG. 1 shows a video signal processing system, for example the video signal section of a digital video recorder, with a circuit 11 which separates the incoming analog composite color signal into a luminance component and a chrominance component. The luminance signal is input to an analog-to-digital converter 12, and is two-dimensionally DCT transformed in a circuit 13, modulated with a channel coding in a circuit 14, stored in a memory 15, for example a magnetic tape, demodulated in a circuit 16 according to the channel coding, two-dimensionally inversely DCT transformed in a circuit 17 and, via a digital-to-analog converter 18, re-assembled with the corresponding chrominance signal from the digital-to-analog converter 181 to form an analog composite color signal in a circuit 19. The chrominance signal is processed in the circuits 121 through 181 in the same way as the luminance signal in the respective circuits 12 through 18. For a digital audio signal processor the circuits 12 through 18 can be used as the sound channel and the circuits 11, 19 and 121 through 181 can be omitted.

FIG. 2 shows a magnetic tape 20 with recorded helical tracks 21. The general direction of motion of the video head on the magnetic tape 20 in the search mode is indicated by the dotted line 22. The video heads, or transducers, are arranged on controllable actuators which permit the head to follow a track 21 along steps 23, reproducing segments of digital data. Between the data segments reproduced from the steps 23, the video heads advance, jumping to other positions 23 of the next data track 21, or to a more distant track 24.

FIG. 3 shows an arrangement of components of video signals coded in block form on the tracks of a magnetic tape. A magnetic tape track section 31 includes three blocks of data A, B, C, of equal length having respective end-of-block characteristics A4, B4, and C4. Another track section 32 has three blocks of data a, b, c, of differing lengths. The respective lengths correspond to the amount of data which a coder, for example a DCT coder delivers. The blocks a, b, c. a1, b1 and c1 are direct or DC, components, a2, b2 and c2 are important alternating or AC components, a3, b3 and c3 are less important alternating components, a4, b4 and c4 are end-of-block markings. In the presence of playback errors, data recorded with varying block lengths, as shown for track section 32, hinders the finding of the beginning of the block.

A consistent block length, as shown for track section 31, is advantageous. Accordingly, a constant block length is produced as shown by track 33, where a portion of the less important alternating components c3, from a block c, which has more than an average of amount of data b, is attached to a block a having less than an average amount of data b. When possible the corresponding end-of-block characteristic signal c4 is also attached to block a. This method is described in U.S. Pat. No. 4,907,101 but is ineffective in a "search" operating mode, in which a reproducing head reads partial segments 23 of helical scan tracks 21 of the magnetic tape 20. Information identifying where the read and decoded data of the track sections 23 are to be located in the output picture of a video recorder is not obtained, because only the first block of a complete picture is marked as such. The location information could be obtained by the addition of the end-of-block characteristics a4, b4, c4. For example, with a picture size of 540×576 picture elements and with a block size of 8×8 picture elements and a coding data rate of about 1 bit/picture element then approximately 77 bits would be necessary instead of approximately 64 bits for every block. Such an increase in the amount of data can be avoided if track sections 23 can comprise a number of blocks, for example eight, which are combined into one "superblock" (40), with an address word 401 or 402, added to each superblock as shown in FIG. 4. A coder must be controlled such that the data for the last block within the superblock can still be stored in the storage space for this track block. Unoccupied storage space can be filled up with the value "zero".

FIG. 4 shows a partial track of the magnetic tape with a superblock 40 consisting of blocks 41 through 48, which correspond to blocks A, B, C from 31 or 33 of FIG. 3, and an address 401 or 402.

FIG. 5 shows the output picture 50, of a video recorder in search mode with the position of superblocks 51 through 54. Good spatial resolution is achieved, however the picture is noticeably segmented, i.e. the superblocks are incorrectly located, resulting in reduced temporal resolution.

FIG. 6 shows a further embellishment to the method which produces less segmentation, for example, only two segments 61 and 62 are present in the entire picture 60. The complete picture 60 can also be formed from one segment 60.

FIG. 7 shows a form of storage corresponding to that shown in FIG. 6, where the coding signal components are stored on one track of the magnetic tape. The direct components a1, b1 and n1 are first written at the start of the storage space for the segment 61, 62 or 60. The addresses a5, b5 through n5 of the important alternating components a2, b2 through n2 and the alternating components (coeficients) are written next. The addresses a6, b6 through n6 for the less important alternating components a3, b3 through n3 and the alternating components (coeficients) are written last. A characteristic 701 or 702 is inserted at the start or end of the complete track section which defines the location within the picture 60 of the segment being written (61, 62 or 60). To simplify FIG. 7 some components are not illustrated between the b and the n components, for example between b1 and n1. The coder must be controlled such that the data n1 through n6 for the last block in the segment (for example, 61, 62 or 60) is stored in the storage space provided for the segment. Unoccupied storage space can be filled up with a "zero" value. A segment-free presentation is attained when the direct components of all blocks of one picture, or several pictures, are stored in one track of the magnetic tape and the video heads can only scan an appropriate area of the track in the high speed search. Hence if the DC components of all blocks of a picture, or several pictures, are recorded on a single magnetic track it is possible to obtain in the search mode, a segment-free picture, with reduced spatial resolution.

FIG. 8 shows the block diagram of a coder for the method according to FIGS. 3 through 5. The coder includes a quantizer 811, a multiplexer 821, a demultiplexer 823, FIFO memories 831 and 833, a control circuit 841 and a signal combining circuit 851. The block diagram also illustrates a transmission output terminal 86, a storage medium, such as a tape, is also represented as an alternative for 86. The block diagram of a decoder contains a decoder circuit 812, a demultiplexer 822, a multiplexer 824, FIFO memories 830 and 832, a control circuit 842 and demodulator circuit 852. The coder can be contained within the circuit 14 or 141, and the decoder in the circuit 16 or 161 of FIG. 1.

Block-wise DCT coded picture signals are fed to the input 801 of the coder where the quantizer circuit 811, codes the signals producing variable word lengths. Corresponding output signals a1 through a3, b1 through b3, c1 through c3 are fed to the circuit 821, which contains a multiplexer in which the signals are separated into DC components a1, b1, c1, important alternating components a2, b2, c2 and less important alternating components a3, b3, c3. Direct components a1, b1, c1 are loaded into a first-in-first-out memory (FIFO) 831 and alternating components a2, a3, b2, b3, c2, c3 into a second FIFO memory 833. The level (of filling) of the first FIFO memory 831, or of the second FIFO memory 833, or a combination of the two, for example the sum, of the two levels can be advantageously used as the regulating variable for the quantizing characteristic curve of the quantizer circuit 811. The quantizing characteristic curve of the quantizer 811 and the size of the FIFO memories 831 or 833 must be selected to prevent overflow or underflow in the FIFO memories 831 or 833.

In the demuliplexer circuit 823, direct and alternating components a1 through a3, b1 through b3, c1 through c3 from the two FIFO memories 831 and 833 are assembled according to the arrangement on the track section 33 and end-of-block markings a4, b4, c4 are added. In signal combining circuit 851, several blocks A, B, C are each combined to form one superblock 40 and provided with superblock address information 401 or 402 and, for example, provided with channel modulation and an error detection/correction data.

The control circuit 841 receives signals from the multiplex circuit 821, which indicate the respective actual processing of signal components a1 through c1 or a2 through c2 or a3 through c3 or c3F. Control circuit 821 also receives signals from the input 803, which indicate the location of the current block in the signal before the coding or, respectively, after the decoding. The control circuit 841 supplies the read and write addressing for the FIFO memories 831 and 833, controls the demultiplexer circuit 823, the insertion of end-of-block flags or markings a4, b4, c4 and also controls the circuit 851 to combine the blocks into superlocks 40 and add one of the addresses 401 or 402 to the superblocks.

The output signal from signal combining circuit 851 is transmitted, or stored, at 86 and upon reproduction is fed to the demodulator circuit 852 in the decoder. The channel modulation removal and error correction and the separation of superblock addresses 401 or 402 take place in circuit 852. Superblock addresses 401 or 402 are available at the output terminal 804 of the decoder. Direct components a1, b1, c1 or alternating components a2, a3, b2, b3, c2, c3, c3F are separated from the data stream in a circuit 824, which contains a multiplexer and an end-of-block marking decoder, and loaded into a third FIFO memory 830 or a fourth FIFO memory 832.

The signal components are arranged into a format, such as that shown on track section 32 in FIG. 3, by the demultiplexer circuit 822 and decoded according to their variable word length in the decoder circuit 812. Signal blocks with constant word length and their associated addresses 804 within the picture are then available at the output terminal 802 of the decoder 812, and the use of superblocks enables a "search" operating mode. The control circuit 842 receives block addresses from demodulation circuit 852 which supplies the read and write addressing for direct components a1, b1, c1 or alternating components a2, a3, b2, b3, c2, c3, c3F in the FIFO memories 830 or 832 and also controls the multiplexer in circuit 824 and the demultiplexer in circuit 822.

FIG. 9 is a block diagram for coding and decoding using the method according to FIGS. 3, 6 and 7. The coder contains a quantizer circuit 911, a multiplexer 921, FIFO memories 931, 933, 935, 937 and 939, a control circuit 941, a demultiplexer 923, signal combining circuit 951, and a transmission medium (or a storage medium) 96. The decoder contains a decoder 912, a demultiplexer 922, a multiplexer 924, FIFO memories 930, 932, 934, 936 and 938, control circuit 942 and demodulator 952. The coder can be contained, for example, within the circuit 14 or 141 of FIG. 1 and the decoder within the circuit 16 or 161 of FIG. 1.

In FIG. 9, blockwise DCT coded picture signals are input to the input terminal 901 of a coder. The coder includes a circuit 911, which contains a quantizer which codes the signals with variable length words. Corresponding output signals a1 through a3, b1 through b3, c1 through c3 are fed to the multiplexer circuit 921, which splits the signals into direct components a1, b1, c1, important alternating components a2, b2, c2 and less important alternating components a3, b3, c3. Direct components a1, b1 through n1 of a segment (for example 61, or picture 60) are loaded into a first FIFO memory 931, important alternating components a2, b2 through n2 are loaded into a second FIFO memory 933 and less important alternating components a3, b3 through n3 are loaded into a third FIFO memory 935. The addresses a5, b5 through n5 of the important alternating components a2, b2 through n2 are loaded into a fourth FIFO memory 937 and the addresses a6, b6 through n6 of the less important alternating components a3, b3 through n3 are loaded into a fifth FIFO memory 939.

The level of filling of the FIFO memories 931, 933, 935, 937, and 939, or the sum of the levels, stored in several FIFO memories can be advantageously used as the regulating variable for the quantizing characteristic curve of the circuit 911. The quantizing characteristic curve of the circuit 911 and the size of the FIFO memories 931, 933, 935, 937, 939 must be proportioned so that no overflow or underflow appears in the FIFO memories 931, 933, 935, 937, 939.

Direct and alternating components a1, b1 through n1, a2, b2 through n2, a3, b3 through n3 and their addresses a5, b5 through n5, a6, b6 through n6 from the five FIFO memories 931, 933, 935, 937, 939 are configured by the demultiplexer in the circuit 923 according to the arrangement on the track section in FIG. 7. In combiner circuit 951, for example, segments 61, 62 are marked with their addresses 701 and 702 which identify their locations within the picture 60. Alternatively, the full picture 60 can be marked with one of the picture addresses 701 or 702. Circuit 951 also provides channel modulation and the addition of error detection/correction codes.

The control circuit 941 receives signals from the multiplex circuit 921, these signals indicate the respective actual processing of signal components a1, b1 through n1, a2, b2 through n2 or a3, b3 through n3. The input terminal 903 also receives signals which indicate the location of the current block in the signal before the coding, which is also the position after decoding. The control circuit 941 supplies the respective read and write addressing for the FIFO memories 931, 933, 935, 937, 939, controls the circuit 923 with the demultiplexer and controls the circuit 951 with the addressing 701 or 702 of segments 61, 62 or, with the allocation of picture numbers 701 or 702 of pictures 60.

The output signal from the circuit 951 is either stored at 96, for example on magnetic tape, or transmitted to the decoder for reproduction. The signal is input to the demodulator circuit 952 of the decoder. The channel demodulation, error correction, and the separation of segment addresses or picture numbers 701, 702 are performed in demodulator circuit 952. The segment addresses or the picture numbers 701, 702 are available at the output terminal 904 of the decoder.

Direct components a1, b1 through n1, important alternating components a2, b2 through n2 and their addresses a5, b5 through n5, less important alternating components a3, b3 through n3 and their addresses a6, b6 through n6 are separated from the data stream in a circuit 924, which contains both a multiplexer and an address decoder, and loaded into a sixth 930, seventh 932, eighth 934, ninth 936, or tenth 938 FIFO memory. The signal components are arranged, in a form like that shown on track section 32 in FIG. 3, in demultiplexer circuit 922 and decoded corresponding to their variable word length in decoder 912. Signal blocks with constant word length are output at terminal 902 and their associated addresses within the picture, at output terminal 904. In a "search" mode of operation in a segment-type or picture-type of recorded data format the less important alternating components a3, b3 through n3, for example, are replaced with zeros before the decoding.

The control circuit 942 receives block addresses from circuit 952 and supplies the read and write addresses for direct components a1, b1 through n1, the important alternating components a2, b2 through n2, the less important alternating components a3, b3 through n3 and their addresses in the FIFO memories 930, 932, 934, 936, 938 respectively. The control circuit 942 also controls the multiplexer in circuit 924 and the demultiplexer in circuit 922.

I claim:

1. In a method of signal processing a batch-bulk coded digital signal that is segmented into variable-length words which are allocated to constant-length blocks, a given constant-length block receiving a variable-length word which is shorter than a predetermined word length together with a portion of a variable-length word which is longer than said predetermined word length for filling up said given block, an improvement comprising the steps of:

combining several successive constant-length blocks into a superblock which defines a portion of a picture;

adding an address word to said superblock to identify the location of said superblock picture portion within said picture.

2. The method of claim 1 further including the step of temporarily storing said variable-length words in a storing medium and utilizing a level of filling of the storing medium to control a quantizer characteristic curve of a coding section.

3. The method of claim 2, wherein said superblock is decoded at a search speed in substantially equal temporal intervals, said address word locating said superblock at a location substantially the same as that decoded at normal reading speed.

4. A coder for a digital processing system of block, transform coded signals, said transform coded signals having coefficients representing dc components, more important alternating components, and less important alternating components, said coder comprising:

quantizing and coding means for quantizing said block transform coded signals and for coding said signals into variable-length words;

means coupled to said quantizing and coding means for separating said dc components, said more important alternating components, and said less important alternating components;

memory means for storing said dc components, said more important alternating components and said less important alternating components and addresses of said components;

means responsive to said memory means for assembling said variable-length words into equal length segments, said variable-length words having lengths shorter than a predetermined length being combined with portions of said variable-length words having longer length than said predetermined length to form said equal length segments;

a control circuit responsive to said block transform coded signal for controlling said separating means, said memory means and said assembling means;

signal combining means coupled to said assembling means for combining a plurality of said equal length segments into superblocks; and an address generator coupled to said control circuit for generating an address for each superblock, said address being appended to each superblock.

5. The coder of claim 4 wherein said memory means includes at least one first-in-first-out memory.

6. The coder of claim 5 wherein said memory includes individual first-in-first-out memory means for said more important alternating components and said less important alternating components.

7. The method of claim 1 further including the step of positioning said address word at an end of said superblock.

8. The coder of claim 4 wherein, said memory means further comprises means for measuring memory capacity and generating a control signal responsive to memory utilization, said control signal being coupled to said quantizing and coding means.

9. The coder of claim 8 wherein, said quantizing and coding means further comprises a controllable quantizer having a characteristic controllably varied by said control signal.

* * * * *